United States Patent [19]

Baylor

[11] 4,076,333
[45] Feb. 28, 1978

[54] TRACK JOINT WITH COMBINED THRUST MEMBER AND SEAL MEMBERS

[75] Inventor: John Merlin Baylor, Bettendorf, Iowa

[73] Assignee: J. I. Case Company, Racine, Wis.

[21] Appl. No.: 735,451

[22] Filed: Oct. 26, 1976

[51] Int. Cl.² .................. B62D 55/20; F16J 15/34
[52] U.S. Cl. ............................. 305/11; 277/96.1
[58] Field of Search ............ 305/11, 58 R, 58 PC, 305/14; 277/92, 96.1, 95

[56] References Cited

U.S. PATENT DOCUMENTS

| | | |
|---|---|---|
| 2,906,562 | 9/1959 | Burgman .......................... 305/11 |
| 3,110,097 | 11/1963 | Yocum ............................. 305/11 |
| 3,451,727 | 6/1969 | Deli et al. ......................... 305/11 |
| 3,554,560 | 1/1971 | Miyake ............................ 277/92 |
| 3,975,028 | 8/1976 | Satsumabayashi et al. ....... 305/11 X |

Primary Examiner—Robert B. Reeves
Assistant Examiner—John P. Shannon
Attorney, Agent, or Firm—Arthur J. Hansmann

[57] ABSTRACT

A track joint with combined thrust member and seal members and including a track pin and a bushing and two links defining a space therebetween. The thrust member and the seal members are disposed in the space for countering thrust between the bushing and the outer link and for sealing at the joint between the bushing and the pin.

5 Claims, 3 Drawing Figures

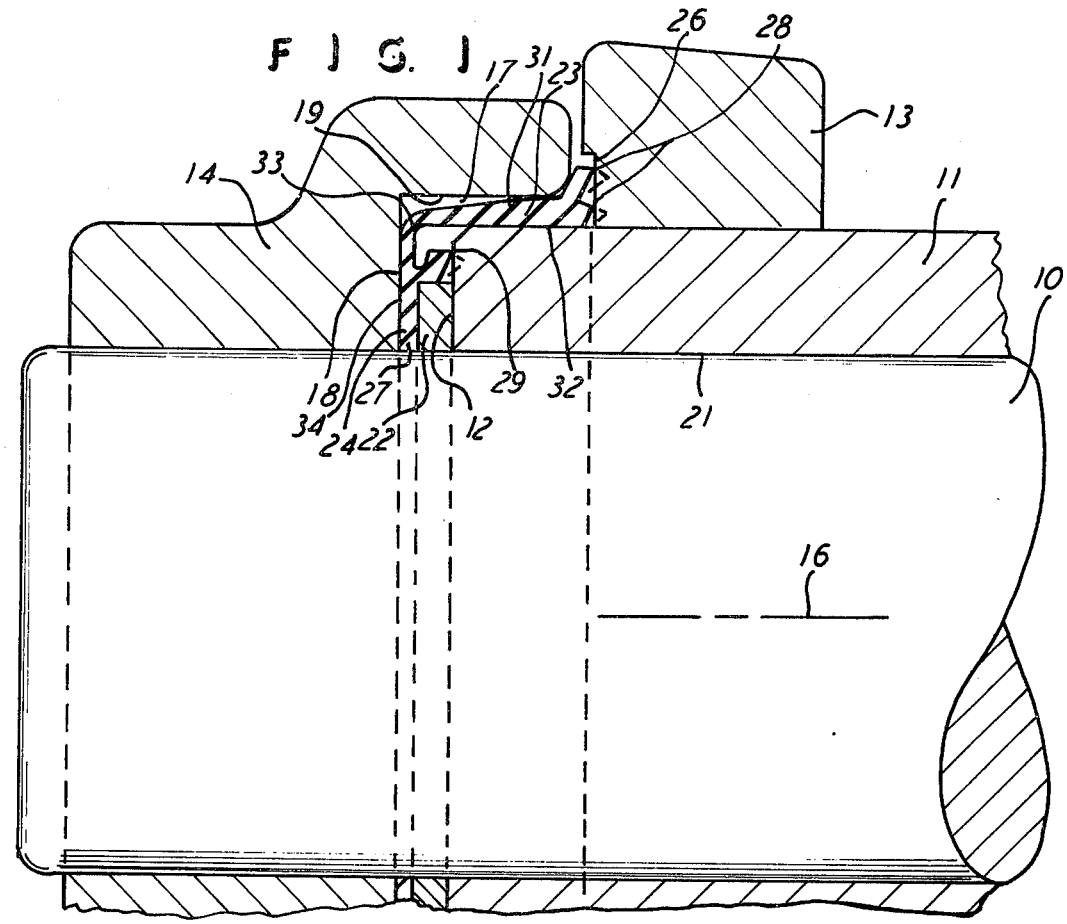
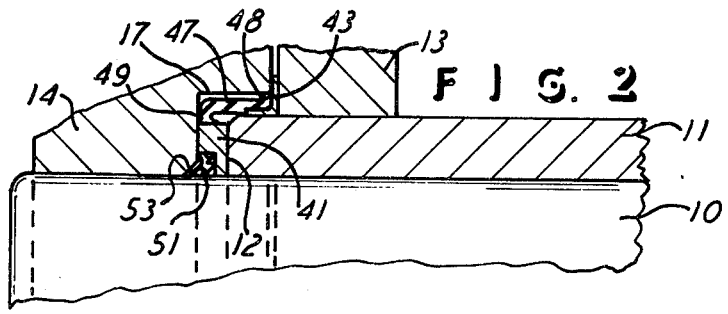
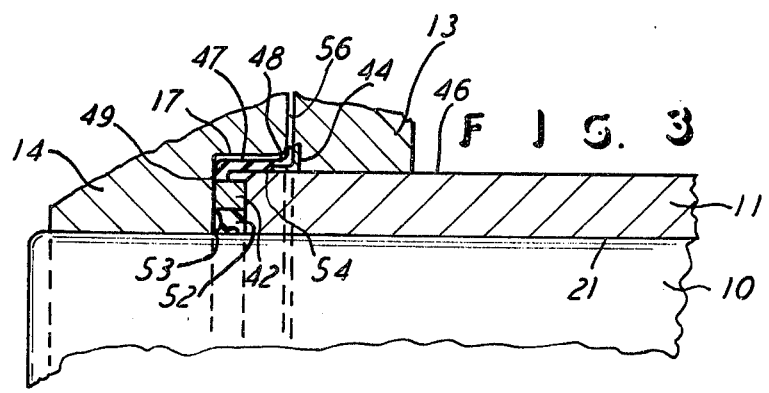

TRACK JOINT WITH COMBINED THRUST MEMBER AND SEAL MEMBERS

This invention relates to a track joint with combined thrust member and seal members, and this track joint is of the type utilized in track chains of crawler tractors.

BACKGROUND OF THE INVENTION

The prior art is already aware of various arrangements of crawler tractor track chain joints which utilize track pins and bushings and links mounted thereon, and the joint is commonly provided with a thrust member and also an elastomer type of seal. Thus the prior art track joints have the thrust member countering the mechanical force directed axially of the track pin, and they also have the seal members serving to keep dust and dirt and the like away from the articular joint provided between the track pin and the track bushing or link itself, in some instances.

My U.S. Pat. No. 3,948,574 discloses one arrangement of a track joint having the track pin and the bushing thereon and the spaced-apart pairs of track links and the elastomer seal therebetween. Further, U.S. Pat. Nos. 3,595,572 and 3,622,165 and 3,680,924 and 3,838,896, for examples, show track joints with combined metal rings and elastomer ring members disposed in the space between the links and the bushing and pin of the joint. In these examples, the metal ring itself is not utilized as a thrust member, and the seals are only of a singular nature and do not provide a dirt and dust and like sealing function on radially opposite dispositions of the rigid or metal ring itself. As such, the metal ring is provided mainly for supporting and presenting the elastomer seal, and it is not functionally utilized for serving as a thrust member or for serving as a seal itself.

U.S. Pat. Nos. 3,218,107 and 3,841,718 are further examples of prior art track joints with both metal rings and elastomer members disposed in the space described above, and, in these examples, the rigid or metal ring itself does extend in contact with both the outer link and the bushing member, and, as such, the metal rings of these examples are available as thrust members between the elements mentioned. However, the elastomer members are not related to the rigid or metal ring member described, and, as such, these examples are not displays or teachings of combined thrust members and two dirt-sealing members, with the dirt-sealing members serving to seal at least two different locations relative to the aforementioned space wherein the seal members are disposed.

Accordingly, it is an object of this invention to improve upon the prior art and to do so with a combined rigid type of thrust member with elastomer dirt-seal members related thereto and sealing the joint in at least two locations so that an optimum dirt-sealing efficiency can be effected. Further, the present invention accomplishes the aforementioned with a simplified type of combined thrust and sealing members, as mentioned, and it is also adaptable to a standard type of track joint arrangement having the usual space for receiving the aforementioned members.

Still further, it is an object and advantage of this invention to provide the aforementioned thrust and seal members in a track chain joint of a conventional nature and to have the seal members positioned and pressed into sealing relation during the assembly of the joint when the track links are pressed onto the track pin. As such, the counterbore in the track link acts as a guide and serves to align the seal members with the outer diameter of the bushing on which at least a portion of the seal members is positioned and effective. Still further, in accomplishing these objectives, the elastomer seal portions or members are compressed into a position and are related to the links and the bushing such that when there is a wearing of the elastomer members they will continue to perform full effectiveness in the sealing since the elastomer member is under compression and will simply continue to maintain sealing contact with the adjacent track joint element, even though a portion of the sealing member or members is worn down.

Additionally, the track joint of this invention accomplishes the aforementioned objectives and it does so with the elastomer portion of the members described above being cylindrical in configuration and being interposed between the two links of the joint and thus having a characteristic for torsional deflection in response to maximum articulation between the links. That is, when the track links are pivoted to at least a certain relative angle therebetween, then the cylindrical portion of the elastomer member will initially deflect or distort to accommodate the pivotal action, and eventually the thrust ring may be moved to slide relative to the outer link, and this is all permitted by virtue of the torsional characteristic described, and yet the dirt-sealing members retain their effectiveness while the full articulation of the joint is accomplished and is not restricted.

Other objects and advantages will become apparent upon reading the following description in light of the accompanying drawings:

BRIEF DESCRIPTION OF THE DRAWINGS

FIG. 1 is a sectional view of a fragment of a track joint of this invention.

FIGS. 2 and 3 are sectional views similar to FIG. 1 on a reduced scale, and showing other embodiments of the thrust and seal members of this invention.

DETAILED DESCRIPTION OF THE PREFERRED EMBODIMENTS

The drawings show the several embodiments of this invention, and it will be understood that there is provided a crawler tractor track chain joint of the type shown in the aforementioned patents, and particularly shown in my U.S. Pat. No. 3,948,574. That is, there is the usual track joint track pin 10 with a bushing 11 piloted thereon and terminating in an end wall or surface 12. A first track link 13 is pressed onto the bushing 11, and a second track link 14 is pressed onto the end of the pin 10. As such, in the usual arrangement, the bushing 11 and link 13 pivot together about the longitudinal axis 16 of the joint shown, and the pin 10 and link 14 also pivot about the axis 16, and thus the links 13 and 14 pivot relative to each other in the usual articulation of the track joint. This will be understood by anyone skilled in the art, since it is a conventional arrangement to the joint described thus far. The embodiments of FIGS. 2 and 3 are similarly arranged.

The links 13 and 14 are thus spaced apart, and the link 14 has a counterbore 17 faced toward the bushing 11 and the link 13, and the counterbore has the bottom wall 18 and the circular side wall 19 defining the counterbore 17. Of course it is important that the joint between the pin 10 and the bushing 11, that is along the line designated 21, be maintained free of dust and dirt so that the joint can continue to articulate without undue binding or wear.

To accomplish the objectives mentioned at the outset, a thrust ring 22 is disposed in the counterbore 17 and is preferrably of a hard material, such as a metal or other hard material, and it is available for resisting the axial thrust between the bushing 11 and the outer link 14. The invention is further described as including a first elastic seal means 23 and a second elastic seal means 24, and these two seal portions or means 23 and 24 extend in opposite radial directions relative to each other and with respect to the ring 22. As such, the first seal means 23 extends into sealing contact with the surface 26 of the link 13, and the second seal means extends into sealing contact with the circumference of the pin 10. That is, it will be understood that the ring 22 extends endlessly around the pin 10, and also the elastomer seal described is of a ring shape and thus extends endlessly around the counterbore 17 and the respective elements of the track joint shown related thereto. Therefore, the second seal means has an end portion 27 which is in sealing contact with the circumference of the pin 10, and the first seal means has two lip or edge portions 28 in dust and dirt-sealing contact with the link surface or wall 26. Further, the first seal portion includes an additional lip 29 which is in sealing contact with the end wall or surface 12 of the bushing 11 and which extends endlessly therearound for further dust sealing at that location. At this time it will also be seen and understood that the lip portions 28 and 29 initially extend to the dotted positions designated and which are shown extending into the link 13 and the bushing 11, respectively, until the final assembly of the joint as shown in FIG. 1. That is, the first seal member or means 23 extends beyond its final assembled position, as shown by the dotted positions of the edges or lips 28 and 29, and in the assembly of the joint, the seal means 23 is compressed axially of the joint and disposed to the full line position shown in the final assembled form of FIG. 1. As such, the seal is under axial compression, and wear within the seal will be accommodated by simply having the seal extend axially to constantly retain sealing contact with the respective walls 26 and 12, as described above, and thus the seal will always retain its desired effective contact and sealing function described herein.

Also, in assembling the joint, the outer link 14 is pressed onto the pin 10 and toward the bushing 11 and the link 13, and the ring 22 is press-fitted onto the pin 10 and forms a seal therewith. Also, the second seal portion 24 is compressed and thus forced into sealing contact with the circumference of the pin 10, and the compressive relationship assures that the seal edge or lip 27 will be in sealing contact with that circumference of the pin 10. Therefore, the ring 22 and assembly portion 24 serve as thrust members between the bushing 11 and the link 14.

Further, the seal portion 23 includes the cylindrical portion 31 which extends coaxially with the axis 16 of the pin 10, and that cylindrical portion 31 is available for extending between the links 13 and 14, as shown in all three embodiments, and the cylindrical portion 31 is actually under compression in the assembled procedure and final form described above. Further, the ring 22 and the elastomer sealing members shown and described as members 23 and 24 may be bonded with the hard or rigid ring 22, or simply the compressive force therebetween can retain them in the desired position for the purpose mentioned.

The consequence of the construction shown and described is that there will be a resistance of thrust between the bushing 11 and the outer link 14, and that is created by the thrust ring 22 and the interposed sealing means or member 24, and there will also be a dirt sealing effected by virtue of the press fit of the ring 22 on pin 10 and by the sealing means 24 and the sealing means 23, at their respective surfaces and rings of contact with the respective elements of the joint, as described. Accordingly, dirt cannot enter the joint between the pin 10 and the bushing 11, and that is the desired consequence for the dirt-sealing effect. In the arrangement, the high effectiveness of lip seal is achieved by the points or lips 28 and 29, and also the self-adjusting feature is accomplished, by virtue of the axial compression of the seal means as described, and the resistance of thrust between the bushing 11 and the outer link 14 is also accomplished. In that arrangement, there is a seal assembly of the thrust ring 22 and the seal portion of the press fit of ring 22 on pin 10, and the seal portion of the lips 28 and 29 and the portion 31 relative to the bushing 11 and link 13.

FIGS. 2 and 3 show other embodiments of the assembly of the combined thrust ring and sealing portions, and in these instances the embodiment of FIG. 2 has its hardened or rigid type of seal ring 41 and the embodiment of FIG. 3 has its seal ring 42. In each instance, another hardened or rigid ring 43 and 44, respectively, is pressed onto the outer circumference 46 of the respective bushing 11, and this serves to pilot the seal means relative to the joint and to hold it firm relative to the bushing 11. In both instances, the radially outer seal means is provided in a cylindrically-shaped portion 47, and the portion 47 terminates in an end 48 which is in bonded contact with the respective ring 43 and 44. Also, the other end 49 of the cylindrical portion 47 may be in bonded contact with the respective rings 41 and 42. Also, it will be seen and understood that the respective piloting rings 43 and 44 are in press-fit with the bushings 11 and are thus in dirt-sealing and affixed relation thereto. As such, there is the first sealing means or portion 47, along with the rings 43 and 44, which extends intermediate the links 13 and 14 and is in dirt-sealing relation therebetween and is available for the axial compression described in connection with FIG. 1 and also is available for torsional deflection.

FIGS. 2 and 3 further show the second seal means or portion 51 and 52, respectively, and these are also shown in contact with the respective thrust rings 41 and 42, and it will further be seen that the thrust rings 41 and 42 extend in contact with the bushing end surface 12 and the counterbore bottom wall 18, in the embodiments of FIGS. 2 and 3. The second seal means 51 and 52 also each have a pointed lip 53 which is disposed in sealing contact with the outer circumference 21 of the joint pin 10. Accordingly, it will be seen that the embodiments of FIGS. 2 and 3 show the respective thrust rings 41 and 42 and the two seal means or members 47 and the seal members 51 and 52. The members 47 are in sealing contact with the counterbore bottom wall 18, and are also in sealing contact with the bushing outer circumference 46 along the inner cylindrical surfaces 54 of the seal portions or members 47.

In this arrangement, the assembly of the joint accommodates the positioning and the final arrangement of the thrust and seal members described, all for the purpose of positioning those members for the functions described. That is, the respective members are initially positioned over the pin 10 which already extends through the bushing 11 in the assembly procedure. Then the outer link 14 is press-fitted onto the pin 10 and moves against the seal and thrust members described and shown in those embodiments and thus the axial movement forces the members to their final assembled position shown, including the position of pressing the rings 43 and 44 onto the bushings 11, and that is accomplished by the inner face 56 of the outer link 14 pressing the rings 43 and 44 into the final assembled position. As such, the cylindrical portion 47 is axially compressed intermediate the links 13 and 14 and thus assures the sealing contact in its shown position. Also, in the embodiments in FIGS. 2 and 3, the torsional characteristic of the first and cylindrical sealing means 47, as described, is achieved and effective to permit the relative pivotal action between the links 13 and 14 while retaining dust-sealing relation therebetween but also it will in no way affect the dust and dirt-sealing characteristics of the second respective seal means 51 and 52, and of course these seal means are effective for precluding the entrance of dirt past those seal members and between the pin 10 and bushing 11. As such, there is shown the seal means of the lip type of seals, since they are of a pointed nature or are relatively thin at their respective designations 28, 29, and 53. The characteristic of the compression of those defined lip seals with the respective pin 10 and link 13 thus provide a secure dirt-sealing arrangement, and it is also provided by the compression of the seal means in the assembly of the joint, so that the cylindrical portions 31 and 47 are under compression, and also the seal means 27 and 51 and 52 are under compression since they would all occupy greater space in their free state or unassembled condition than they occupy in the shown assembled condition, such as shown by the dotted lines relating to the lip seals 28 and 29 in FIG. 1.

What is claimed is:

1. A track joint with combined thrust member and seal members, comprising a track pin, a cylindrical bushing on said pin and having an annular end surface disposed on a plane transverse to the extent of and within the length of said pin, a first track link on said bushing, a second track link on the end of said pin and having an annularly-shaped bearing surface faced toward said annular end surface and being spaced therefrom, a seal assembly including a thrust portion having a rigid thrust ring disposed in the space between said surfaces and with a portion of said assembly extending in contact with both said surfaces for resisting axial thrust forces therebetween, said assembly including an elastic first seal portion bonded to said thrust ring and extending therefrom and contacting said bushing for sealing between said thrust ring and said bushing, and said assembly including an elastic second seal portion bonded to said thrust ring and extending into sealing contact with said pin for sealing thereat, said first elastic seal portion extending from said thrust ring in a cylindrical portion extending co-axially with said pin and between said track links and being under compression between said links and being free of restriction in the length of said cylindrical portion intermediate said links, for torsional deflection to accommodate relative pivotal movement between said links.

2. The track joint with combined thrust member and seal members as claimed in claim 1, wherein said bushing is rotatably piloted on said pin and said second track link is press-fitted onto said pin, all for relative pivotal action between said bushing and said second track link, a ring on said first seal portion and being in a press-fit on said bushing, and said second seal portion including a lip in contact with said pin for movement relative to said pin.

3. The track joint with combined thrust member and seal members as claimed in claim 1, including a non-elastic material ring affixed to said first seal portion and being press-fitted onto said bushing for securing said first seal portion relative to said bushing.

4. The track joint with combined thrust member and seal members as claimed in claim 1, wherein both of said track links have counterbores therein faced toward each other, said thrust ring and said seal portions all being disposed in said counterbore in said second track link, said first seal portion extending from said ring and terminating in a lip portion disposed in said counterbore in said first track link and being in abutment with said first track link for sealing thereat.

5. The track joint with combined thrust member and seal members as claimed in claim 1, wherein said bushing is rotatably piloted on said pin and said second track link is in a press-fit on said pin, all for relative pivotal action between said bushing and said second track link.

* * * * *